Oct. 15, 1963
G. H. RISACHER
3,106,801
PORTABLE ELECTRIC GREENHOUSE
Filed Aug. 30, 1961
2 Sheets-Sheet 1
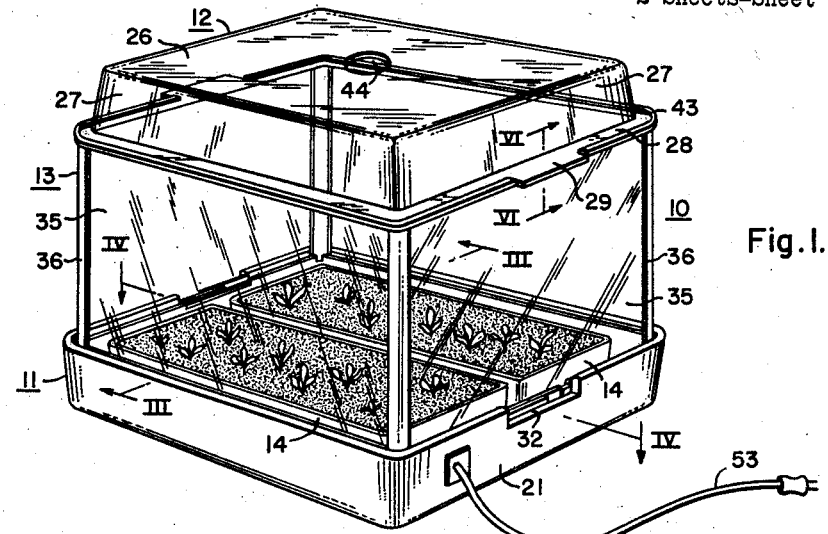
Fig. 1.
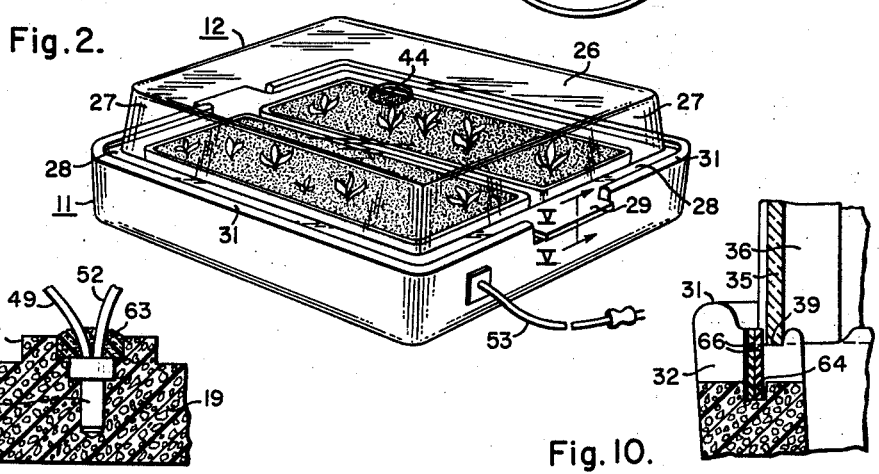
Fig. 2.
Fig. 9.
Fig. 10.
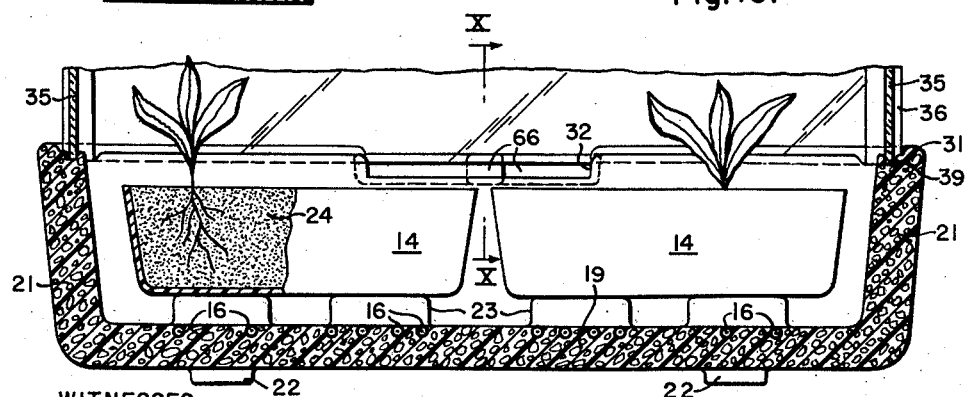
Fig. 3.
WITNESSES
Edwin E. Bassler
INVENTOR
Gerard H. Risacher
BY
Ralph T. French
ATTORNEY

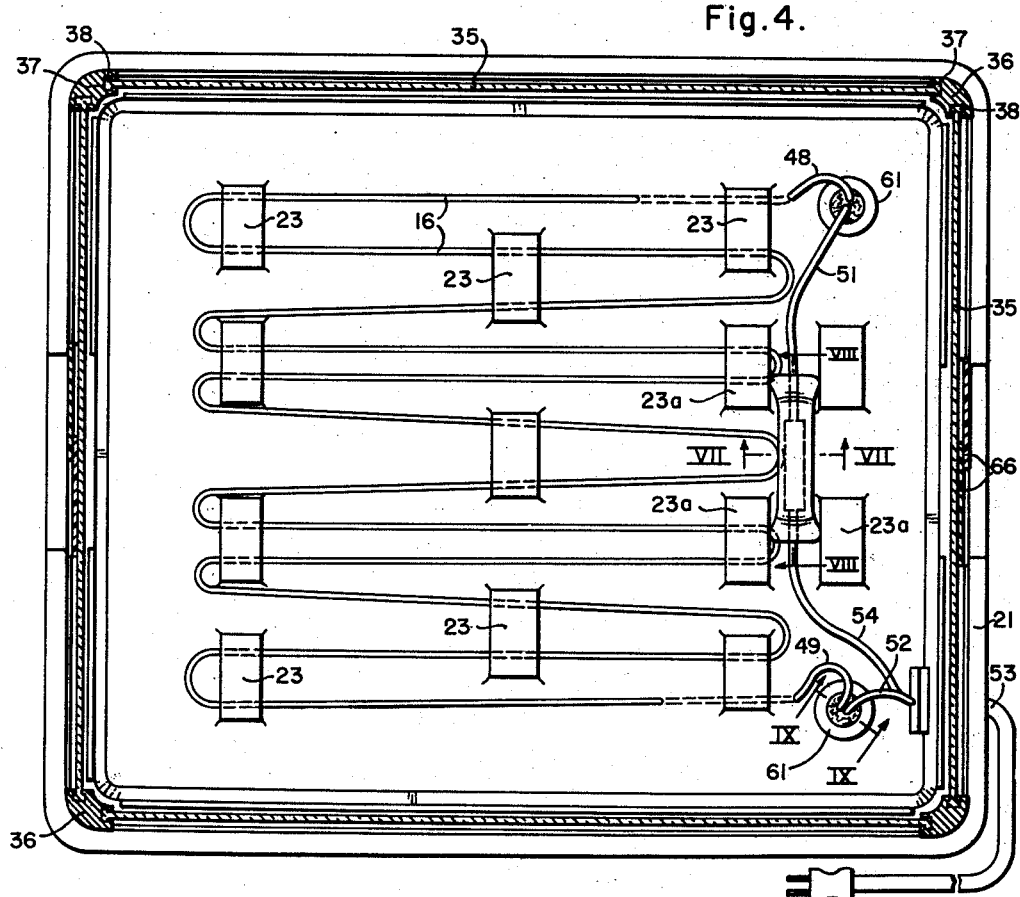
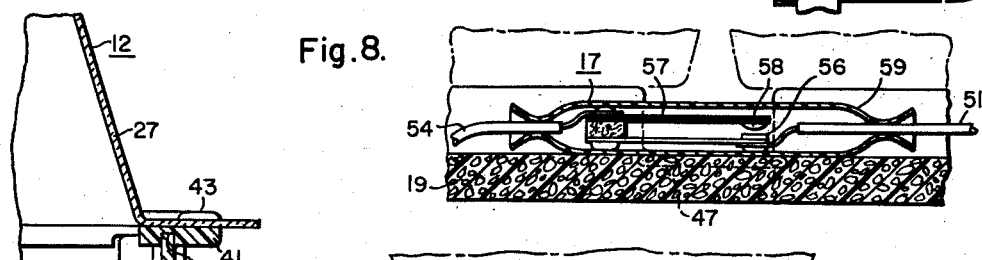
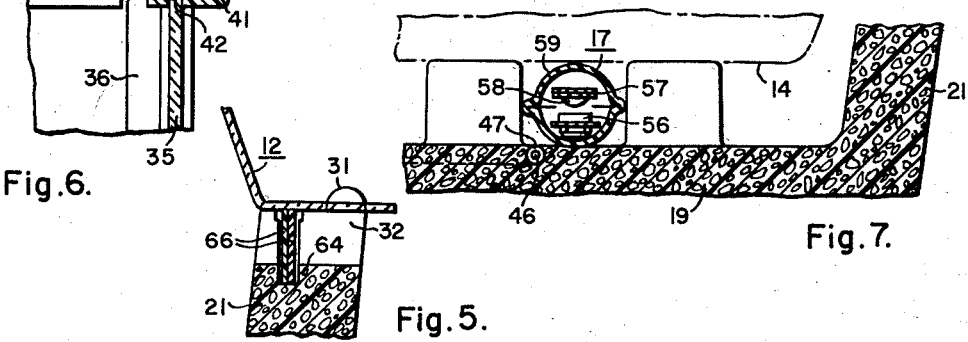

United States Patent Office 3,106,801
Patented Oct. 15, 1963

3,106,801
PORTABLE ELECTRIC GREENHOUSE
Gerard H. Risacher, Mansfield, Ohio, assignor to Westinghouse Electric Corporation, East Pittsburgh, Pa., a corporation of Pennsylvania
Filed Aug. 30, 1961, Ser. No. 134,896
5 Claims. (Cl. 47—17)

This invention relates to greenhouses or hotbeds, more particularly to portable greenhouses for use in homes, offices and similar locations, and has for an object to provide a greenhouse which is automatic in operation and capable of growing flowers, plants, cuttings, etc. with a minimum of care and experience by the user.

Basically, a greenhouse constructed in accordance with the present invention comprises a base of molded heat insulating material including bottom and side walls defining a tray-receiving space, a cover for the base, an electrical heating element at the bottom of the tray-receiving space, a planting tray, means supporting the planting tray in vertically-spaced relation to the heating element and a thermostatic control for the heating element. In addition, there may be included means for suitably ventilating the interior of the greenhouse when the plants are sufficiently developed to require or stand such ventilation.

An important feature contributing to the highly successful results obtained by portable greenhouses utilizing the present invention is the location of the thermostatic control relative to the electric heating element it controls. Contrary to prior known practices in this field, the control of the present invention is positioned on the upper surface of the base bottom, in close proximity to, or in actual contact with, a portion of the electric heating element.

Exhaustive tests show that this location of the control relative to the heating element provides the desired control of the temperature of the growing medium. Suitable control of the growing medium temperature was not effected when the thermostat was located away from the heating element where it was subject only to the temperature of the air within the greenhouse.

Another important feature of the present invention is the novel arrangement of the heating element with respect to the greenhouse base. Preferably, the base is of molded heat insulating material, for example, styrofoam, the bottom and side walls having a thickness in the order of three-quarters of an inch. The heating element may be in the form of an electric resistance wire, preferably coated for protection from moisture, and this coated wire may be molded into the insulating material of the base bottom with the top of the coated wire exposed at the inner surface of the base bottom. Thus, the heat produced by electrical energization of the wire is readily dissipated to the interior of the greenhouse, and the relatively thick layer of insulating material between the wire and the outside of the base effectively prevents loss of heat from the wire to the exterior of the greenhouse via the base itself. At the same time, the wire is retained in the desired position and arrangement without the need of any special locating or anchoring devices.

An object of the invention is to permanently and fixedly mount an electrical heating element in a portable greenhouse for maximum release of heat to the interior of the greenhouse and minimum loss of heat through the base of the greenhouse.

Another object of the invention is to closely control the heater of a portable greenhouse so that the temperature of the growing medium therein is controlled within limits which are ideal for satisfactory seed germination.

Yet another object of the invention is to closely control the heater of a portable greenhouse so that the temperature of the air in the region of plan growth never becomes high enough to wilt or otherwise injure plant growth.

These and other objects are effected by the invention as will be apparent from the following description taken in connection with the accompanying drawings, forming a part of this application, in which:

FIG. 1 is a perspective view of a greenhouse constructed in accordance with the present invention;

FIG. 2 is a perspective view of a similar greenhouse constructed in accordance with the present invention, but omitting the side wall extensions which separate the base and cover in FIG. 1;

FIG. 3 is an enlarged transverse sectional view, taken along the line III—III of FIG. 1, looking in the direction indicated by the arrows;

FIG. 4 is an enlarged horizontal sectional view, taken along the line IV—IV of FIG. 1, looking in the direction indicated by the arrows;

FIG. 5 is an enlarged fragmentary sectional view taken along the line V—V of FIG. 2 looking in the direction indicated by the arrows;

FIG. 6 is an enlarged fragmentary sectional view taken along the line VI—VI of FIG. 1, looking in the direction indicated by the arrows;

FIG. 7 is an enlarged fragmentary sectional view taken along the line VII—VII of FIG. 4, looking in the direction indicated by the arrows;

FIG. 8 is an enlarged fragmentary sectional view taken along the line VIII—VIII of FIG. 4, looking in the direction indicated by the arrows;

FIG. 9 is an enlarged fragmentary sectional view taken along the line IX—IX of FIG. 4, looking in the direction indicated by the arrows; and, FIG. 10 is an enlarged fragmentary sectional view taken along the line X—X of FIG. 3, looking in the direction indicated by the arrows.

In FIG. 1 there is shown at 10, one form of greenhouse constructed in accordance with the present invention and comprising a base 11, a cover 12, side extensions 13 spacing the cover 12 from the base 11, a pair of planting trays 14, a heater 16 and a heater control 17.

FIG. 2 shows a greenhouse of lower construction than that shown in FIG. 1, in that the side extensions 13 are omitted. Otherwise, the two greenhouses are the same.

The base 11 is molded of suitable heat insulating material, preferably a foam type of plastic, for example, styrofoam. The base includes a bottom wall 19 and integral upwardly-extending side walls 21. While the thickness of the bottom and side walls is not critical, it has been found from tests that a wall thickness in the vicinity of three-quarters of an inch provides entirely satisfactory results. The bottom wall may have molded integrally therewith depending bosses 22 providing feet to support the base on any desired supporting surface. The base bottom wall 19 also has integrally formed therewith upwardly projecting pads 23 (FIGS. 3 and 4) which serve to support one or more planting trays 14 in spaced relation to the bottom wall 19 and the side walls 21 of the base 11 for free circulation of air therebeneath and thereabout.

The trays 14 may be filled with a suitable planting medium. While earth or other conventional growing medium may be utilized, the use of a manufactured type of material, being completely sterile, has been found particularly desirable. One such material which is readily available in hardware stores and nursery supply houses is sold under the trade name "Vermiculite."

The cover 12 includes a top wall 26 and depending side walls 27, all formed as a single molding of plastic material which should be at least translucent for passage of light and preferably transparent to facilitate viewing growth activity within the greenhouse. The lower edges of the cover side walls 27 are provided with a horizontal outwardly projecting flange 28 which, in the low greenhouse of FIG. 2, rests upon the upper edge of the base side walls 21. These base side walls are provided with a peripheral upstanding bead 31, which serves as a retaining structure to prevent displacement of the cover 12 on the base 11. The cover 12 may be provided, at two opposed sides thereof, with handles 29 formed as extensions of the peripheral flange 28, these handles being of sufficient horizontal extent to project outwardly beyond the base side walls for ready engagement by the fingers of the user.

As well illustrated in FIG. 1, 3, 5 and 10, the base side walls 21 are cut away or notched, as at 32, at the upper edges thereof in the region of the cover handles 29 with the handles 29 disposed in the notches 32 when the cover is in closing relation to the base. Actually, the notches or cut away areas 32 in the base side walls extend substantially below the handles 29 to provide ventilating openings whose effective areas may be adjusted by means to be described later.

Referring to FIGS. 1, 3 and 4, it will be seen that additional growing space may be provided within the greenhouse by the use of the side extensions 13, which include transparent side and end plastic panels 35 which are interlocked with vertical corner posts 36 which may be of suitable metal or even of plastic or any other relatively stiff material. The panels are interlocked with the corner posts 36 by sliding the bulbous vertical edges 38 of the panels into mating bulbous vertical slots 37 in the adjacent edges of the corner posts 36.

The upper edges of the base side walls 21 are provided with upwardly opening grooves 39 which, as illustrated in FIG. 3, receive and retain the lower edges of the extension side wall panels 35. At the meeting corners of the base side walls 21, the grooves 39 are enlarged to receive the lower ends of the side extension posts 36.

A top rim gasket 41, which may be made of plastic, rubber or other suitable material, is disposed at the top of the side extension construction 13 and is provided on its under surface with downwardly facing grooves 42 similar in shape to the grooves 39 in the upper edges of the base side walls, to receive the upper edges of the side wall panels 35 and the upper ends of the posts 36. The top rim gasket 41 is provided at the periphery of its top surface with an upstanding bead 43 which, when the cover 12 is in place, confines the latter and restricts it against lateral displacement. Preferably, the cover 12 is provided, at the center of its top wall 26, with a finger opening 44 to facilitate placement and removal of the cover and also to provide for ventilation within the greenhouse when ventilation is required.

As best shown in FIGS. 3 and 4, the heater 16 comprises a single length of resistance wire 46 encased in a covering of plastic or other suitable moisture protective material (FIG. 7). This covered wire 46 is looped back and forth a number of times longitudinally of the base bottom wall and in the preferred construction herein illustrated is actually molded into the upper portion of the latter adjacent the top surface of the bottom wall so that the wire is held in the desired position and arrangement. The major portion of the bottom wall thickness of heat insulating material is below the resistance wire and the upper surface of this wire is exposed to the interior of the greenhouse at the upper surface of the base bottom wall. Insofar as satisfactory heating action is concerned, the wire may be positioned on top of the base bottom wall rather than imbedded therein.

FIG. 4 shows the general disposition of the looped wire 16 in the bottom of the base and the sectional views of FIGS. 3 and 7 clearly show how the wire is imbedded in the insulating material of the base still exposed at its upper surface to the interior of the greenhouse. While imbedding of the heating element or wire in the molded base bottom wall provides satisfactory anchoring of the wire against displacement, further anchoring against accidental displacement of the heating element results from locating the supporting pads 23, on which the planting trays 14 rest, in such manner that they overlie portions of each loop of wire and this feature is particularly desirable if the wire rests on, rather than is molded into, the base. At this same time, these pads are spaced from one another to an extent sufficient to insure free circulation of air in the space between the base bottom wall and the planting trays thereabove.

The two terminal portions 48 and 49 of the heating wire extend upwardly into the interior of the base and the terminal 48 is joined to terminal wire 51 of the heater control 17 while the heating wire terminal portion 49 is similarly connected to a terminal portion of an electric cord 53 which serves to establish an electric circuit between the heater 16 and external source of electric power.

The terminal of the remaining wire 54 of the electric cord 53 is directly connected with the heater control 17, which control is shown in detail in FIG. 8. It will be seen that the wire 51 is connected with a fixed contact 56 of the control and that the other wire 54 is connected, through a bimetallic arm 57, with a movable contact 58 of the control. The contacts 56 and 58, when in engagement, close a circuit from the source of electric current via the electric cord 53 and the control 17, to the heater 16.

The bimetal 57 has its high expansion side toward the fixed contact 56 with the result that, as the temperature of the bimetal increases, it deflects in a direction to separate the contacts 56 and 58, thereby interrupting the electrical circuit to the heater 16. With the circuit interrupted and the heater deenergized, the bimetal 57 cools and deflects in the opposite direction to close the circuit. It should be noted that the bimetallic arm 57 constitutes a portion of the circuit to the heater and consequently is partially heated by its internal resistance to the flow of current therethrough. This provides, in effect, an anticipatory action which helps to prevent overshooting of the heating effect of the heater 16.

The control elements just described are housed in a capsule 59 which may be of plastic material and which is completely sealed against moisture by the application of heat and pressure either with or without the addition of cement, to flatten and seal the ends of the capsule.

An important feature of the present invention lies in the specific location of this capsule and its contents relative to the heater wire 46. As best shown in FIGS. 8 and 7, the capsule is disposed in direct contact with the top surface of the base bottom wall 19 and may actually be cemented thereto. However, cementing may be unnecessary as the four adjacent supporting pads 23a are so positioned as to frictionally receive the flared flattened ends of the capsule 59 to thereby retain the capsule in its selected position in contact with the base bottom wall. It should be noted that, at the location selected for the capsule, one loop of the heating wire extends into either close proximity or even into direct contact with the capsule to insure that the bimetal 57 therein is responsive to the heat produced by the heating wire when it is energized.

By this novel arrangement and disposition of the control 117 relative to the heater 16, it is assured that the temperature of the planting medium 24 in the planting trays 14 remains relatively constant independently of changes in the temperature of the air in the growing space above the trays. In previously known portable greenhouses, thermostatic means provided for controlling the temperature within the greenhouse have been responsive primarily to the temperature of the air in the growing space above the trays.

In the arrangement of the present invention the planting medium receives part of its heat by convection from heated air passing upwardly around the trays and part by radiation from the looped heating element, such radiant energy being transmitted to the bottom walls of the planting trays and thence to the planting medium.

With the control 17 located below the planting trays, in close proximity to, or in actual engagement with, the heating element 16, the control is responsive to both the temperature of the heated air below the planting trays and to the heat output of the heating element. This minimizes temperature variations within the greenhouse.

If the control were located in the growing space above the planting trays, its response to heat output of the heater would be delayed to such an extent that wide temperature swings could occur in the growing space, adversely affecting plant growth.

As previously mentioned, it has been found that the most satisfactory planting medium may well be a material which has poor heat transmitting characteristics. It is desirable to keep the temperature of the growing medium substantially constant and the low heat conductivity of the planting medium is a distinct advantage in that it is very slow to give up its heat and consequently the temperature thereof does not fluctuate with rapid changes in the temperature of the air surrounding the planting trays. In other words, the slow rate of temperature change in the planting medium tends to level out the peaks and valleys which occur in the temperature of the air surrounding the planting medium and which would be transferred to the temperature of the planting medium itself if the latter had a high heat conductivity characteristic.

The joining of the heater wire terminal portions 48 and 59 to their associated wires 51 and 52 is effected by the use of conventional clamping connectors 62, received in mating openings provided in bosses 61 molded integrally with the base bottom wall 19 projecting upwardly from the latter at locations to conveniently receive the connectors 62 when they have been placed on the joined wire terminals. The openings which receive the connectors 62 are of such depth as to provide space above the connectors for reception of sealing material 63, for example, epoxy potting compound. This compound is poured into the openings as a liquid and thereafter hardens to provide a complete seal for the terminals against moisture or exposure to air.

Reference has been made previously to the fact that the cut away openings 32 in the upper edges of two of the base side walls 21 provide for ventilation of the interior of the greenhouse, when desired. During periods of seed germination, and before the plants appear and develop, it is preferable that no ventilation take place. Accordingly, the ventilating openings 32 may be closed by pairs of plastic closures 66 in the form of flat strips of plastic material, each being a trifle longer than one-half the length of the ventilating slots 32, so that they may overlap and completely close the slots when they are disposed in upwardly opening grooves 64 formed at the bottom of the slots 32, as best shown in FIGS. 3, 4 and 5. It will be noted from FIGS. 3 and 4 that the grooves 64 also extend upwardly into the ends of the ventilating slots 32 so that the plastic closures are held in an upright or vertical position when in use. By using only one plastic closure 66, partial ventilation may be effected and by removing all of the plastic strips, additional ventilation is effected. Not only is flow of air transversely of the said beds provided for by the opposed ventilating slots 32, but vertical flow of air may also be effected by leaving the cover top opening 44 uncovered. During the germination period, it will be found desirable to close this top opening 44 by a strip of adhesive or other suitable means.

While the invention has been shown in several forms, it will be obvious to those skilled in the art that it is not so limited, but is susceptible of various other changes and modifications without departing from the spirit thereof.

What is claimed is:

1. In a portable greenhouse, a base of molded foam-type heat insulating material including a bottom wall and integral upstanding side walls, a cover for said base, an electrical heating wire disposed in the material of the bottom wall of the base adjacent the upper surface thereof, the upper surface of said wire being exposed at the upper surface of said bottom wall, whereby heat generated in said wire passes to the interior of the greenhouse, a plurality of supporting members projecting upwardly from said bottom wall with their upper surfaces lying in a common horizontal plane for supporting a planting tray in spaced substantially unobstructed overlying relation to the heating wire, and a thermostat for controlling electrical energization of said heating wire, said thermostat being positioned near a portion of the heating wire, whereby it is responsive at least in part to the heat of said heating wire.

2. In a portable greenhouse, a base of molded foam-type heat-insulating material including a bottom wall and integral upstanding side walls, a cover for said base, an electrical resistance wire having a moisture-resistant covering disposed in the material of the bottom wall of the base adjacent the upper surface thereof, the upper surface of the covering of said wire being exposed at the upper surface of said bottom wall, whereby heat generated in said wire passes to the interior of the greenhouse, supporting structure projecting upwardly from said bottom wall with its upper surface lying in a horizontal plane for supporting a planting tray in spaced overlying relation to the heating wire, and a thermostat for controlling electrical energization of said heating wire, said thermostat being located adjacent and in overlying relation to said wire, whereby it is responsive at least in part to the heat of said heating wire.

3. In a portable greenhouse, a base of molded foam-type heat-insulating material including a bottom wall and integral side walls, a cover for said base, an electrical heating element carried by the bottom wall of the base, a plurality of supporting members projecting upwardly from said bottom wall with their upper surfaces lying in a common horizontal plane, a planting tray supported on said supporting member in spaced overlying relation to the heating element, and a thermostatic control for said heating element, said thermostatic control being located on the base bottom wall and in close relation to said heating element, whereby it is responsive at least in part to the heat of said heating element.

4. In a portable electrically heated greenhouse, a base of molded foam-type heat-insulating material, a cover for said base, said base including a bottom wall and side walls integral therewith, an electrical heating element carried by the base bottom wall for ready passage of heat therefrom to the interior of the greenhouse, means for supporting a planting tray in spaced relation to the heating element and to the base side walls for free circulation of air about the tray, and means for establishing an electrical circuit between said electrical heating element and a source of electrical power, said last-mentioned means including a thermostat housed in a capsule secured on the base bottom wall adjacent a portion of the heating element, whereby it is responsive at least in part to the heat of said heating element.

5. In a portable greenhouse, a base of molded foam-type heat insulating material including a bottom wall and integral upstanding side walls, an elongated electrical heating element convoluted to form a plurality of spaced parallel straight portions joined at adjacent ends by bent portions, said straight and bent portions being carried by the base bottom wall for ready passage of heat therefrom to the interior of the greenhouse, a plurality of tray-supporting bosses integral with the base bottom wall, said bosses being so located with respect to the heating element straight portions that each such straight portion is overlaid by at least one of said bosses, means for establishing an electrical circuit between said heating element and a source of electric power, said last-mentioned means including a thermostat disposed in close proximity to at least one of the heater element portions, whereby it is responsive at least in part to the heat of said heating element, means securing said thermostat in the above-mentioned position, and means protecting said thermostat from moisture.

References Cited in the file of this patent

UNITED STATES PATENTS

| | | |
|---|---|---|
| 469,490 | Steers | Feb. 23, 1892 |
| 1,954,674 | Lager | Apr. 10, 1934 |
| 1,942,477 | Jacobus | Jan. 9, 1934 |
| 2,300,776 | Collins | Nov. 3, 1942 |
| 2,592,976 | Thomas | Apr. 15, 1952 |
| 2,709,838 | Zausner | June 7, 1955 |
| 2,904,933 | King | Sept. 22, 1959 |
| 2,963,819 | Hoch | Dec. 13, 1960 |